United States Patent
Martin

(10) Patent No.: US 6,386,341 B1
(45) Date of Patent: May 14, 2002

(54) BRAKE DISK MADE OF A FIBER-REINFORCED MATERIAL

(75) Inventor: Roland Martin, Weissach (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 09/583,578

(22) Filed: May 31, 2000

(30) Foreign Application Priority Data

May 31, 1999 (DE) ......................................... 199 25 003

(51) Int. Cl.⁷ .............................................. F16D 65/12
(52) U.S. Cl. .................... 188/218 XL; 188/264 AA; 188/73.2
(58) Field of Search ..................... 188/218 XL, 73.2, 188/264 A, 264 AA, 18 A, 71.6, 251 AH; 192/70.11, 107 R, 113.2, 113.26

(56) References Cited

U.S. PATENT DOCUMENTS

| | | | | |
|---|---|---|---|---|
| 2,215,421 A | * | 9/1940 | Eksergian | 188/218 XL |
| 3,710,914 A | * | 1/1973 | Lowey et al. | 188/218 XL |
| 4,281,745 A | * | 8/1981 | Wirth | 188/218 XL |
| 4,821,860 A | * | 4/1989 | Crawford et al. | 188/218 XL |
| 5,188,203 A | * | 2/1993 | Winter | 188/218 XL |
| 5,358,086 A | * | 10/1994 | Muller et al. | 188/218 XL |
| 5,509,510 A | * | 4/1996 | Ihm | 188/218 XL |
| 6,234,282 B1 | * | 5/2001 | Martin | 188/218 XL |

FOREIGN PATENT DOCUMENTS

| | | |
|---|---|---|
| DE | 1 813 850 | 7/1970 |
| DE | 1 940 669 | 6/1977 |
| DE | 25 57 649 | 6/1977 |
| DE | 44 45 226 A1 | 6/1996 |
| DE | 297 10 533 | 1/1998 |
| DE | 197 21 473 A1 | 12/1998 |
| DE | 198 16 381 A1 | 10/1999 |
| EP | 699845 | * 3/1996 |
| JP | 352434 | * 12/2000 |
| WO | 7901105 | * 12/1979 |
| WO | 9530841 | * 11/1995 |

* cited by examiner

Primary Examiner—Douglas C. Butler
(74) Attorney, Agent, or Firm—Crowell & Moring, LLP

(57) ABSTRACT

A brake disk made of a fiber-reinforced material includes two assembled friction rings. The friction rings, on interior sides, are provided with ribs. The two friction rings are supported with respect to one another along at least a portion of the ribs. In order to provide a suitable shaping of faces of the ribs, faces used as coupling faces are constructed such that a coupling of the friction rings is caused in precisely one rotating direction and, in a particular case, such that the coupling faces are arranged in an alternating manner.

21 Claims, 2 Drawing Sheets

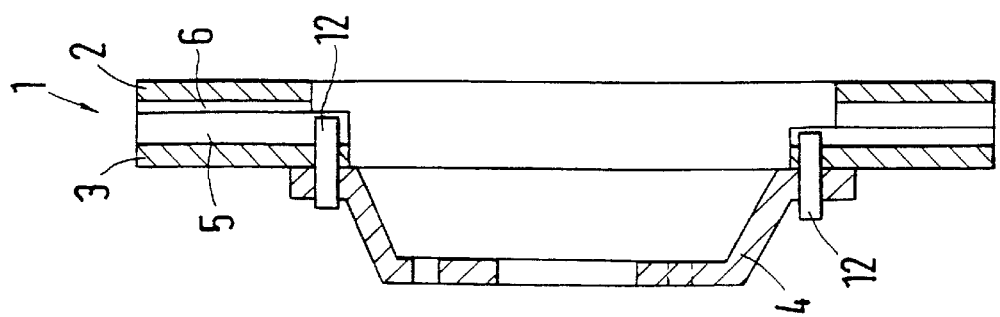
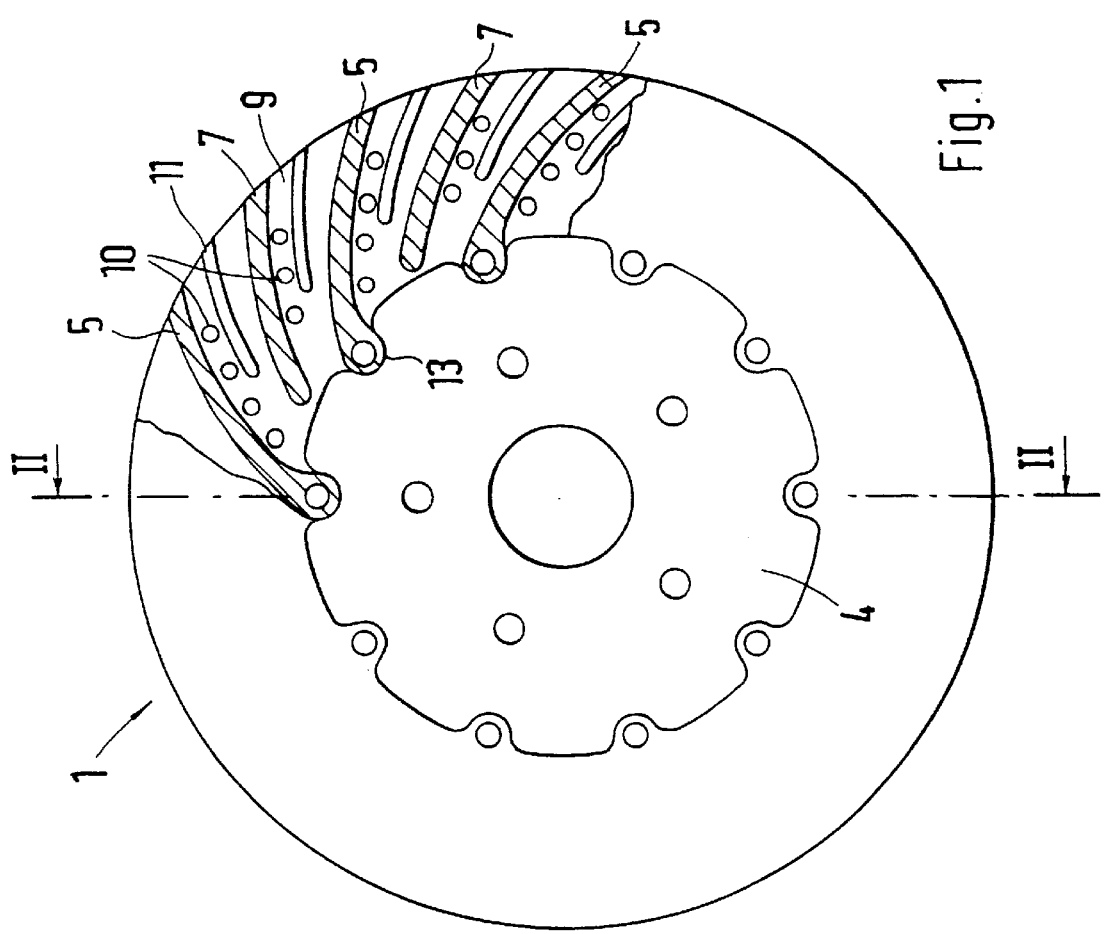

BRAKE DISK MADE OF A FIBER-REINFORCED MATERIAL

This application claims the priority of German application 199 25 003.0, filed May 31, 1999, the disclosure of which is expressly incorporated by reference herein.

BACKGROUND AND SUMMARY OF THE INVENTION

The present invention relates to a brake disk made of a fiber-reinforced material including two assembled friction rings provided with ribs at interior sides and which are supported with respect to one another along at least a portion of the ribs.

German Patent Document DE 44 45 226 A1 relates to a brake disk for disk brakes which consists of a material of the carbon group. According to one embodiment, the brake disk is produced in halves such that each of its radial ribs is molded to one friction ring. Connection of the friction rings is to take place by way of correspondingly constructed faces of the ribs.

With respect to this prior art, it is an object of the invention to provide a suitable shaping of such faces.

According to the invention, this object is achieved by providing portions of the ribs used for support with coupling faces which correspond on a face side and which cause a coupling of the friction rings exactly in one rotating direction. The coupling faces are arranged in an alternating manner. It is suggested that faces used as coupling faces be constructed such that coupling of the friction rings is caused exactly in one rotating direction and such that the coupling faces are arranged in an alternating manner. The coupling of the friction rings in exactly one rotating direction means, in this context, that, in addition to the axial support, the ribs are connected with one another, for example, only during a rotation to the right of one friction ring with respect to the other friction ring; during a rotation to the left, the ribs would detach from one another. Since the the coupling faces are arranged alternately on the ribs, the two fiction rings are coupled with one another in both directions. The special advantage of this arrangement is that coupling faces acting only in one rotating direction can be produced particularly easily. In particular, with the materials used, it is possible to produce such coupling faces already in the molding process of the friction rings without any additional reworking. The coupling faces can preferably be constructed as slanted plane faces or so that each face is stepped on one side.

Advantageous further developments of the invention are also reflected in the claims.

It is suggested to provide, in addition to the coupling faces, support faces without any coupling of the friction rings in the rotating direction. The support faces preferably may have a plane construction. Since only a single production measurement, specifically the height of the support forces, is of considerable importance in this case, their production in a molding process or machining process is much simpler than the production of coupling faces. The number of coupling faces, therefore, can be reduced to that required for transmitting a torque from one friction ring to the other friction ring.

While slanted faces are easier to produce, stepped faces have the advantage that, here, forces introduced in the axial direction, such as forces generated by the brake linings, cause no reaction forces in the circumferential direction. In connection with a molding process, it may, in addition, be advantageous to construct the coupling faces as slanted wavy faces. Such faces are well suited for a molding process because they have no sharp edges. Simultaneously, their profiles can be designed such that forces in the axial direction can also be transmitted without generating any reaction forces in the circumferential direction.

The above-mentioned coupling face constructions are suitable for ribs which are arranged in a radial, tangential manner and also for ribs which are arranged in an involute curved manner. Furthermore, in addition to ribs with coupling faces and ribs with support faces, half-ribs can be provided such that each half-rib is arranged opposite one another on the interior side of the friction rings. In the cooling ducts formed by the ribs with the coupling faces and the support faces between the friction rings, these half-ribs provide additional surfaces for improving the heat transfer from the brake disk to the cooling air flowing through it.

For a further improvement of wet-braking action and heat transfer to the cooling air, bores can be provided in the friction ring. These bores can preferably already be made during the molding process of the friction rings.

To produce the brake disk, a fixing of the two friction rings in the axial direction is sufficient because the friction rings are coupled with one another in the rotating direction by the construction of the coupling faces under the effect of the tension forces applied during a braking operation. Care must only be taken to transmit the torques generated during the braking operation by way of one or both friction rings to a brake pot or similar device.

The invention will now be explained in detail in connection with embodiments illustrated in the figures.

BRIEF DESCRIPTION OF THE DRAWINGS

FIG. 1 is a top view of a brake disk;

FIG. 2 is a sectional view along line II—II of the brake disk shown in FIG. 1;

DESCRIPTION OF THE PREFERRED EMBODIMENTS

Figure 3:
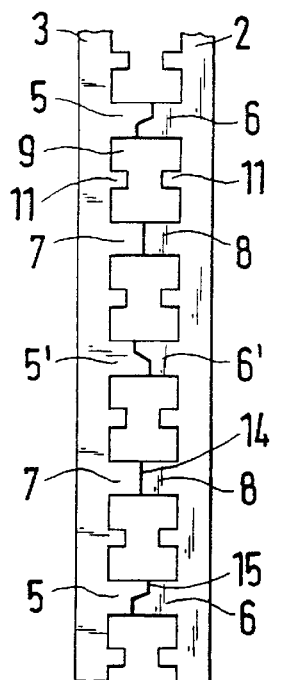
FIG. 3 is a schematic representation of a developed view of the outer circumference of the brake disk according to a first embodiment.

An internally ventilated brake disk 1 made of a fiber-reinforced material, here, on a carbon basis, includes two friction rings 2 and 3 as well as a pot 4. Each of the friction rings 2, 3 has ribs 5, 7 and 6, 8 which are in contact with one another. Between ribs 5 to 8, air ducts 9 are formed for cooling the brake disk 1. Continuous bores 10 in different arrangements can be provided in the friction rings 2, 3. Furthermore, half-ribs 11 can be arranged between the ribs 5 to 8 which are situated opposite one another in the air ducts 6 without touching one another.

The production of the friction rings 2 and 3, in each case, takes place in a molding process without any reworking. The pot 4 can be produced in an arbitrary manner, for example, from a metallic material. The friction rings 3 as well as the pot 4 are connected by connection elements 12, such as screws, rivets or similar devices, for transmitting a torque. In this case, the connection elements 12 engage in eyes 13 which are formed on the end sides of the ribs 5. It is additionally possible to also provide such eyes 13 on the end sides of the ribs 6 of the friction ring 2 arranged away from the pot 4, and to connect the pot 4 with the two friction rings 2, 3.

FIG. 3 shows, in a schematic representation of a developed view of the outer circumference of the brake disk 1, the construction of the ribs 5 to 8. The ribs 7, 8 are constructed as support ribs and have faces 14 which extend in parallel to a circumferential direction U. The faces 14 can then amount only to forces in the axial direction A.

In contrast, the ribs 5, 6 constructed as coupling ribs have faces 15 constructed as coupling faces which cause a coupling of the friction rings 2, 3 in the axial direction A as well as in the circumferential direction U. (For this purpose, it is assumed that, in FIG. 3, the left friction ring 3 is stationary while the right friction ring 2 is to be moved in the circumferential direction U.) Another pair of coupling ribs 5', 6' is arranged such that a coupling takes place in the opposite circumferential direction U'. The coupling ribs 5, 6, which operate in the circumferential direction U, and the Coupling ribs 5', 6', which operate in the opposite circumferential direction U', are arranged in an alternating manner. One or several support ribs 7, 8 can be provided between the coupling ribs 5, 6, 5', 6'.

In the first embodiment according to FIG. 3, the coupling face 15 is constructed in the form of a step. In this case, it is advantageous for the molding process that the coupling face 15 does not come to be situated parallel to the axial direction A which also corresponds to the removal direction from the mold during the molding process. For this reason, no right angle is formed in the coupling face 15; instead, two sections, which are arranged in parallel to the friction rings 2, 3, are connected with one another by way of a slanted surface.

Figure 4:
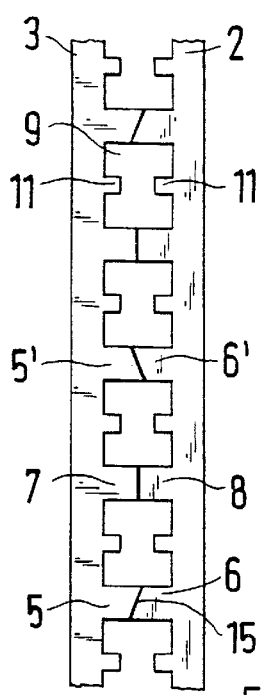
FIG. 4 is a view similar to FIG. 3 but showing a second embodiment.

FIG. 4 shows an alternative construction of the coupling face 15 as a slanted plane face.

Figure 5:
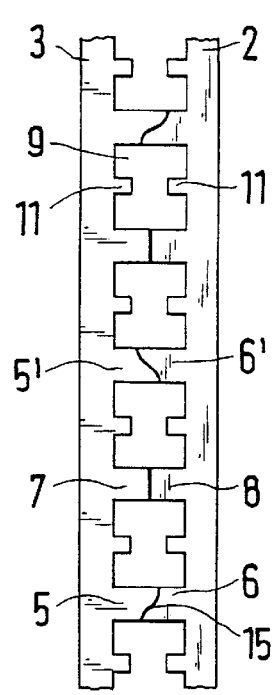
FIG. 5 is a view similar to FIG. 3 but showing a third embodiment.

As illustrated in FIG. 5, according to another alternative, the coupling face 15 can also have a wavy shape and, in this case, can have an approximately S-shaped construction.

Figure 6:
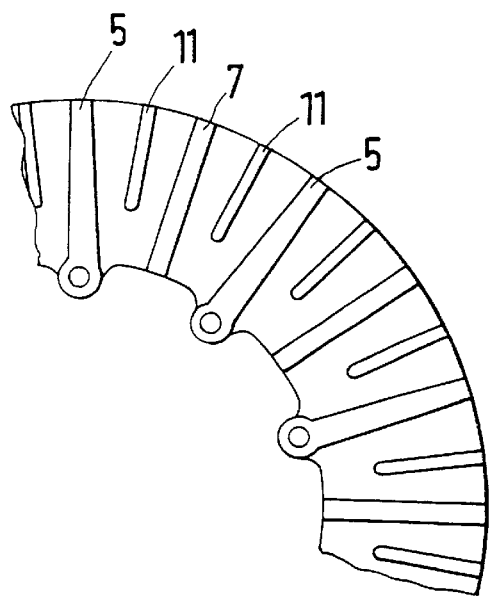
FIG. 6 is a view of a first alternative alignment of the ribs.
Figure 7:
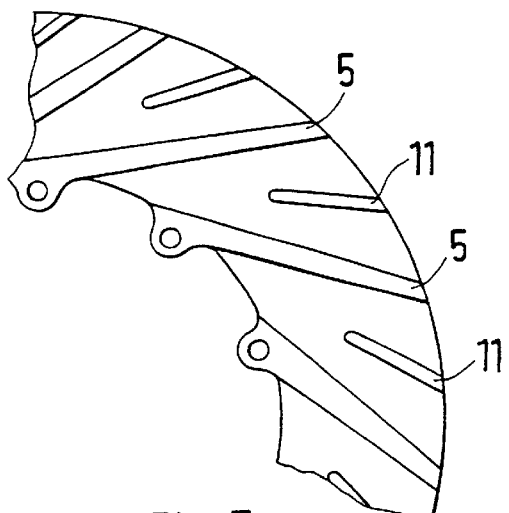
FIG. 7 is a view of a second alternative alignment of the ribs.

As an alternative to the involute curved arrangement of the ribs 6, 5, 7, 8, 11, as illustrated in FIG. 6, the ribs can also be arranged in a radial manner or, as illustrated in FIG. 7, in a tangential manner.

Since it is difficult to machine friction rings 2, 3 made of a fiber-reinforced carbon silicon carbide material (C/C—SiC material) in the final condition, the coupling faces 15, the support faces 14 and, optionally, the bores 10 are already made during the manufacturing of a molded body from carbon-fiber-reinforced carbon (a so-called green compact). This preferably takes place within the scope of the molding process, but a mechanical machining is naturally also conceivable. In a second step, the molded body is infiltrated with liquid silicon, and the molded body is then subjected to a thermal treatment in a third step, in which case the silicon converts with carbon to SiC. Since these steps do not change the outer shape of the friction rings 2, 3, the coupling faces 15 and the support faces 14 (as well as the optional bores 10) do not have to be reworked.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

I claim:

1. Brake disk made of a fiber-reinforced material, comprising two assembled friction rings, the friction rings, at interior sides, being provided with ribs and being supported with respect to one another along at least a portion of the ribs, wherein portions of the ribs used for support have coupling faces which correspond on a face side and which cause a coupling of the friction rings exactly in one rotating direction, the coupling faces being arranged in an alternating manner.

2. Brake disk according to claim 1, wherein the coupling faces are slanted plane faces.

3. Brake disk according to claim 2, wherein the ribs are arranged in a radial manner.

4. Brake disk according to claim 2, wherein the ribs are arranged in a tangential manner.

5. Brake disk according to claim 2, wherein the ribs are arranged in an involutely curved manner.

6. Brake disk according to claim 2, and further comprising half-ribs provided one at least on of the interior sides of the friction rings.

7. Brake disk according to claim 2, wherein, in addition, bores are provided in the friction rings.

8. Brake disk according to claim 1, wherein the coupling faces are stepped faces on one side.

9. Brake disk according to claim 8, wherein additional support faces are provided without any coupling of the friction rings in the rotating direction.

10. Brake disk according to claim 9, wherein the coupling faces and the support faces are manufactured by a molding process without any reworking.

11. Brake disk according to claim 8, wherein the ribs are arranged-in a radial manner.

12. Brake disk according to claim 8, wherein the ribs are arranged in a tangential manner.

13. Brake disk according to claim 8, wherein the ribs are arranged in an involutely curved manner.

14. Brake disk according to claim 8, and further comprising half-ribs provided on at least one of the interior sides of the friction rings.

15. Brake disk according to claim 1, wherein the ribs are arranged in a radial manner.

16. Brake disk according to claim 1, wherein the ribs are arranged in a tangential manner.

17. Brake disk according to claim 1, wherein the ribs are arranged in an involutely curved manner.

18. Brake disk according to claim 1, and further comprising half-ribs provided on at least one of the interior sides of the friction rings.

19. Brake disk according to claim 1, wherein, in addition, bores are provided in the friction rings.

20. Brake disk according to claim 19, wherein the bores are manufactured by a molding process without any reworking.

21. Brake disk according to claim 1, wherein each of the friction rings is a one-piece friction ring.

* * * * *